United States Patent Office 2,901,508
Patented Aug. 25, 1959

---

2,901,508

ORGANIC COMPOUNDS AND PROCESS

Jerome Korman, Portage Township, Kalamazoo County, Mich., assignor to The Upjohn Company, Kalamazoo, Mich., a corporation of Michigan No Drawing. Application May 2, 1957
Serial No. 656,518

3 Claims. (Cl. 260—562)

This invention relates to novel compounds, and to a process for preparing them. It is more particularly directed to the lower alkanoamides which are produced by acylating 3,3-bis(p-aminophenyl)-2-butanone (amphenone) with a lower alkanoyl radical; and to a process for the preparation of these amides.

The compounds of the invention have the following general structural formula:

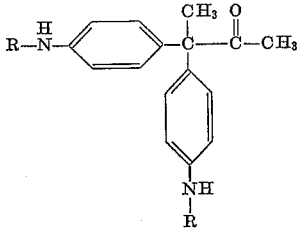

wherein R is an acyl group of a lower alkanoic acid containing no more than four carbon atoms, i.e., R is an alkanoyl group containing no more than four carbon atoms.

The discoverers of amphenone [Allen and Corwin, J. Am. Chem. Soc. 72, 117 (1950)] assigned to it the configuration of a substituted desoxybenzoin; but I have proved the correct configuration to be as follows:

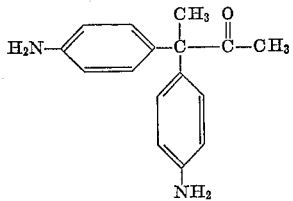

Amphenone B, 3,3-bis(p-aminophenyl)-2-butanone dihydrochloride, has been demonstrated to exert unusually complex inhibition of adrenal cortical secretion [Thorn et al., New England J. Med. 254, 547–551 (1956); Renold et al., ibid. 256, 16–21 (1957); and also Vogt, J. Endocrinol. 14, xxv–xxvi( 1956)]. It is useful in the treatment of adrenal cortical hyperfunction (Cushing's syndrome). It possesses antiestrogenic activity similar to that of progesterone; and is unusual in being a nonsteroidal compound known to exert progestational activity in the Clauberg rabbit preparation [Hertz et al., Recent Progress in Hormone Research 11, 119–141 (1955)]. Moreover, it acts as a pentobarbital-like anesthetic when administered in sufficient concentrations to dogs, cats, and rabbits.

However, the administration of amphenone B to patients suffering from hyperadrenal corticalism is complicated by undesirable side effects such as extreme depression, gastrointestinal upset, and methemoglobinemia. Furthermore, upon administration, undesirable peak concentrations in the blood are followed by excretion in the urine within a relatively short time.

An object of the invention is to provide derivatives of amphenone which possess the physiologic activity of amphenone, but which are free from its undesirable side-effects. A further object is to provide derivatives of amphenone which have physiologic activity and prolonged therapeutic effect.

It has now been found that the lower alkanoamides of amphenone are active in the suppression of adrenal hyperfunction, and that their distinctive physiologic behavior overcomes many of the undesirable side-effects of amphenone. They are less water-soluble than amphenone or the acid addition salts of amphenone, and are available to the tissues over a longer time when administered orally. Thus, the compounds of the invention facilitate the maintenance of uniform levels of amphenone activity in the blood.

The lower alkanoamides of the invention can be easily prepared in good yield by well-known chemical reactions. The acid halide of a lower alkanoic acid can be reacted directly with the amino groups of amphenone; or preferably, one can mix amphenone with an anhydride of a lower alkanoic acid and by conventional techniques separate the resulting amide. When employing an acid halide reactant, an acid acceptor such as pyridine, dimethylaniline, triethylamine, methylpyridine, lutidine, collidine and the like can be used to neutralize the hydrogen halide formed during the reaction. When employing an acid anhydride reactant, no acid acceptor need be included. It is sometimes desirable to increase the rate of the acylation reaction by heating and stirring the reaction mixture. After the reaction is substantially completed, the amide is recovered by pouring the reaction mixture into cold water, isolating the precipitated crude product, washing, and if desired, further purifying by conventional procedures such as recrystallization, chromatography, etc. The invention contemplates acylation on both primary amino groups of the amphenone molecule; so according to the stoichiometry of the reaction two moles of acylating agent (lower alkanoyl halide or lower alkanoic acid anhydride) are required per mole of amphenone. Usually, a slight excess of anhydride will insure completeness of reaction, and slightly better yields have resulted.

Representative acylating agents include acetyl chloride, acetyl bromide, propionyl chloride, butyryl chloride, isobutyryl chloride, acetic anhydride, propionic anhydride, butyric anhydride, isobutyric anhydride, and the like.

The following examples are illustrative of the process and products of the present invention, but are not to be construed as limiting.

*Example 1.—Preparation of 3,3-bis(p-acetamidophenyl)-2-butanone*

A mixture consisting of three grams of 3,3-bis(p-aminophenyl)-2-butanone and fifteen milliliters of acetic anhydride was heated with refluxing for two hours. The reaction mixture was then cooled and poured into cold water. An oil separated from the aqueous phase, and solidified after standing for some time. The solid was twice recrystallized from a mixture of ethyl acetate and technical hexane (essentially methyl-substituted pentanes and n-hexane having a boiling range of 140 to 160 degrees Fahrenheit). The product, 3,3-bis(p-acetamidophenyl)-2-butanone, weighed 1.86 grams and melted at 160.5–162.5 degrees centigrade.

*Analysis.*—Calc'd for $C_{20}H_{22}N_2O_3$: C, 70.98; H, 6.55; N, 8.28. Found: C, 70.93; H, 6.86; N, 8.02.

*Example 2.—Preparation of 3,3-bis(p-propionamidophenyl)-2-butanone*

A mixture consisting of three grams of 3,3-bis(p-aminophenyl)-2-butanone and ten milliliters of propionic anhydride was heated on a steam bath for three hours. It was then cooled and poured into cold water. An oil separated from the aqueous phase and was decanted. It was then dissolved in methylene chloride, washed with five percent aqueous sodium hydroxide, washed with water, and dried. The desired 3,3-bis(p-propionamidophenyl)-2-butanone was obtained as an oil upon removing the solvent by distillation.

*Example 3.—Preparation of 3,3-bis(p-butyramidophenyl)-2-butanone*

Following the procedure of Example 2, but substituting therein an equivalent amount of butyric anhydride for propionic anhydride, 3,3-bis(p-butyramidophenyl)-2-butanone was prepared.

*Example 4.—Preparation of 3,3-bis(p-isobutyramidophenyl)-2-butanone*

Following the procedure of Example 2, but substituting therein an equivalent amount of isobutyric anhydride for propionic anhydride, 3,3-bis(p-isobutyramidophenyl)-2-butanone was prepared.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound having the following general structural formula:

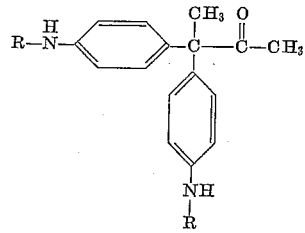

wherein R is an alkanoyl group containing not more than four carbon atoms.
2. 3,3-bis(p-acetamidophenyl)-2-butanone.
3. 3,3-bis(p-propionamidophenyl)-2-butanone.

References Cited in the file of this patent
UNITED STATES PATENTS
2,683,719    Kerwin _____ July 13, 1954

OTHER REFERENCES

Hertz et al.: Recent Progress in Hormone Research, vol. XI, 1955, pp. 119–139.